United States Patent [19]
Kurata

[11] Patent Number: 6,004,128
[45] Date of Patent: Dec. 21, 1999

[54] COMBUSTION SYSTEM

[76] Inventor: Tadao Kurata, 3-7-2, Nishiooizumi, Nerima-ku, Tokyo, Japan

[21] Appl. No.: 09/245,081

[22] Filed: Feb. 5, 1999

[30] Foreign Application Priority Data

Jul. 29, 1998 [JP] Japan .................................. 10-213850

[51] Int. Cl.$^6$ ...................................................... F23L 9/00
[52] U.S. Cl. ................................................ 431/190; 431/2
[58] Field of Search ......................................... 431/2, 190

[56] References Cited

U.S. PATENT DOCUMENTS

| | | | |
|---|---|---|---|
| 3,844,716 | 10/1974 | Noakes ........................................ | 431/2 |
| 4,806,485 | 2/1989 | Birks et al. ................................ | 422/70 |
| 5,242,835 | 9/1993 | Jensen .................................. | 422/82.05 |

*Primary Examiner*—Carroll Dority
*Attorney, Agent, or Firm*—Shlesinger, Arkwright & Garvey, LLP

[57] ABSTRACT

There is described a combustion system which completely incinerates substances to be burned, particularly non-industrial wastes and industrial wastes, without involvement of generation of harmful substances. The combustion system has a singlet-oxygen generator for generating singlet-oxygen by excitation of oxygen from the triplet state to the singlet state, and induction means for introducing the thus-generated singlet oxygen into a combustion chamber. More preferably, the combustion system has merging means for merging the singlet oxygen and air. Alternatively, the singlet oxygen generator is built into a combustion chamber. Further, the singlet oxygen generator is arranged so as to excite triplet oxygen to singlet oxygen by means of microwave discharge.

4 Claims, 2 Drawing Sheets

COMBUSTION SYSTEM

BACKGROUND OF THE INVENTION

1. Field of the Invention

The present invention relates to a system for incinerating substances, and more particularly, to a combustion system suitable for incinerating non-industrial wastes and industrial wastes.

2. Description of the Related Art

Incineration of a substance is usually carried out by means of a high-temperature oxidative reaction between oxygen contained in air and the substance, and therefore the presence of oxygen-containing air is indispensable for combustion. Air surrounding the planet has been considered to be formed during the course of a long history of evolution from the Genesis era. The era at which air has become substantially equal in composition to that at the present time, particularly, the time when the oxygen content of air substantially reached its current level, is not known with certainty. At least in terms of atmospheric composition, it is believed that there is not much difference between air that existed at the time when human beings emerged and air that exists now. Primitive men should have observed, as one type of natural phenomenon, combustion in such forms as spontaneous ignition typified by a forest fire. Combustion per se is a natural phenomenon which has been well known since time immemorial. Since primitive man mastered fire, which is considered to have taken place far back into the prehistoric period, the techniques for mastering fire have probably been utilized actively, as combustion method, for the sake of our lives.

A conventional combustion system is designed so as to effect an oxidative reaction by utilization of oxygen contained in the air, and is provided with means for supplying sufficient oxygen or air to a combustion furnace. In some cases, a proper amount of fuel is added to the furnace in order to efficiently incinerate substances to be combusted, as needed. An air outlet section is further formed in the combustion furnace, and, for example, an exhaust gas is delivered from the air outlet section to a cooling chamber where solid residues are eliminated from the gas. The resultant gas is exhausted from a chimney. In effect, various types of combustion systems or incinerators are available; e.g., a total continuous feed incinerator, a quasi-continuous feed incinerator, a mechanical batch feed incinerator, and a fixed batch feed incinerator.

Although the majority of substances are completely burned during the course of combustion and are converted to stable oxides, some of the substances are incompletely burned and yield various types of volatile, less-volatile, and nonvolatile products. For example, when organic substances, such as ordinary organic compounds, are completely burned, water and carbon dioxides are largely produced. More specifically, when cellulose which is the principal constituent of paper or soybean oil is completely burned, water and carbon dioxides are produced. In contrast, if the cellulose or soybean oil is incompletely burned, various types of unburned substances, e.g., carbon monoxides, aldehyde, and soot are exhausted and a polynuclear aromatic compound, such as pyrene, is produced from the cellulose. Tobacco smoke and exhaust gas from a car are also known to contain various types of products resulting from incomplete combustion.

Unburned products contain substances deleterious to the global environment or human health. Particularly, toxic substances which are also known as environmental hormones act as endocrine disturbing chemicals, such as dioxin, are produced in an incinerator as a result of incineration of wastes at insufficient temperatures. Serious environmental pollution caused by such toxic substances have recently been considered a global social problem. All the countries of the world, including Japan, are required to take immediately measures against such pollution.

In light of the present situation set forth, the object of the present invention is to provide a combustion system which completely burns substances to be incinerated, particularly, non-industrial wastes and industrial wastes, without involvement of generation of harmful substances.

SUMMARY OF THE INVENTION

Oxygen which is contained in air and contributes to ordinary combustion has a multi-electron system in a stable ground state. Air is well known, the ground state of an oxygen molecules has a spin quantum number of one and hence corresponds to a multiplet state of spin degeneracy level 3. Oxygen molecules in a triplet state (hereinafter referred to as "triplet oxygen") are stable and are utilized for respiration by creatures. Triplet oxygen molecules are indispensable for sustaining the life of creatures in the planet, including human beings. Through breathing, a human acquires energy by oxidation of constituents of food, such as sugar, lipids, proteins, and the like. An oxidation process associated with generation of biological energy may be deemed a combustion process which proceeds in a very mild manner.

Oxygen molecules in a singlet state, i.e., an excited state, (hereinafter referred to as "singlet oxygen") are highly reactive and have a short chemical life. Therefore, ordinary air contains few singlet oxygen molecules. In a case where triplet oxygen is converted to singlet oxygen in a laboratory, photosensitization utilizing a relevant coloring agent is common. Very little attention has conventionally been focused on contribution of singlet oxygen to combustion. Singlet oxygen considerably differs from triplet oxygen in chemical properties and reactivity. For example, triplet oxygen readily induces a radical chain reaction, whereas singlet oxygen is an electrophilic reagent and is prone to react with a substance having a stronger electron donative characteristic. Accordingly, singlet oxygen is more apt to induce a two-electron reaction than triplet oxygen is. For instance, singlet oxygen can actively induce reactions which triplet oxygen is less apt to induce, such as direct addition to double bonds and generation of dioxetane. As mentioned above, the difference in reactive characteristic between singlet oxygen and triplet oxygen leads to a considerable qualitative and quantitative difference between products resulting from oxidation of a substance by singlet oxygen and products resulting from oxidation of a substance by triplet oxygen.

To accomplish the foregoing objective, according to one aspect of the present invention, there is provided a combustion system comprising:

a singlet-oxygen generator for generating singlet-oxygen by excitation of oxygen from the triplet state to the singlet state; and induction means for introducing the thus-generated singlet oxygen into a combustion chamber.

According to a second aspect of the present invention, there is provided a combustion system comprising:

a singlet-oxygen generator for generating singlet-oxygen by excitation of oxygen from the triplet state to the singlet state;

merging means for merging the thus-generated singlet oxygen and air; and introduction means for introducing the singlet oxygen merged with air into a combustion chamber.

According to a third aspect of the present invention, there is provided a combustion system comprising of a combustion chamber with a singlet oxygen generator built into the combustion chamber, in which generator singlet oxygen is generated by excitation of oxygen from a triplet state to a singlet state.

Preferably, in any one of the aforementioned combustion systems, the singlet oxygen generator excites oxygen from a triplet state to a singlet state by the use of microwave energy.

Singlet oxygen has an energy level of only 22.5 kcal/mol higher than that of triplet oxygen in the ground state and is unstable and highly reactive. When a substance to be burned is incinerated in the presence of highly reactive singlet oxygen, the substance can be completely burned at temperatures lower than that required for burning the substance in the presence of triplet oxygen.

Further, under the same conditions, a substance to be burned is more efficiently incinerated by singlet oxygen than by triplet oxygen.

DETAILED DESCRIPTION OF THE PREFERRED EMBODIMENT

Figure 1:
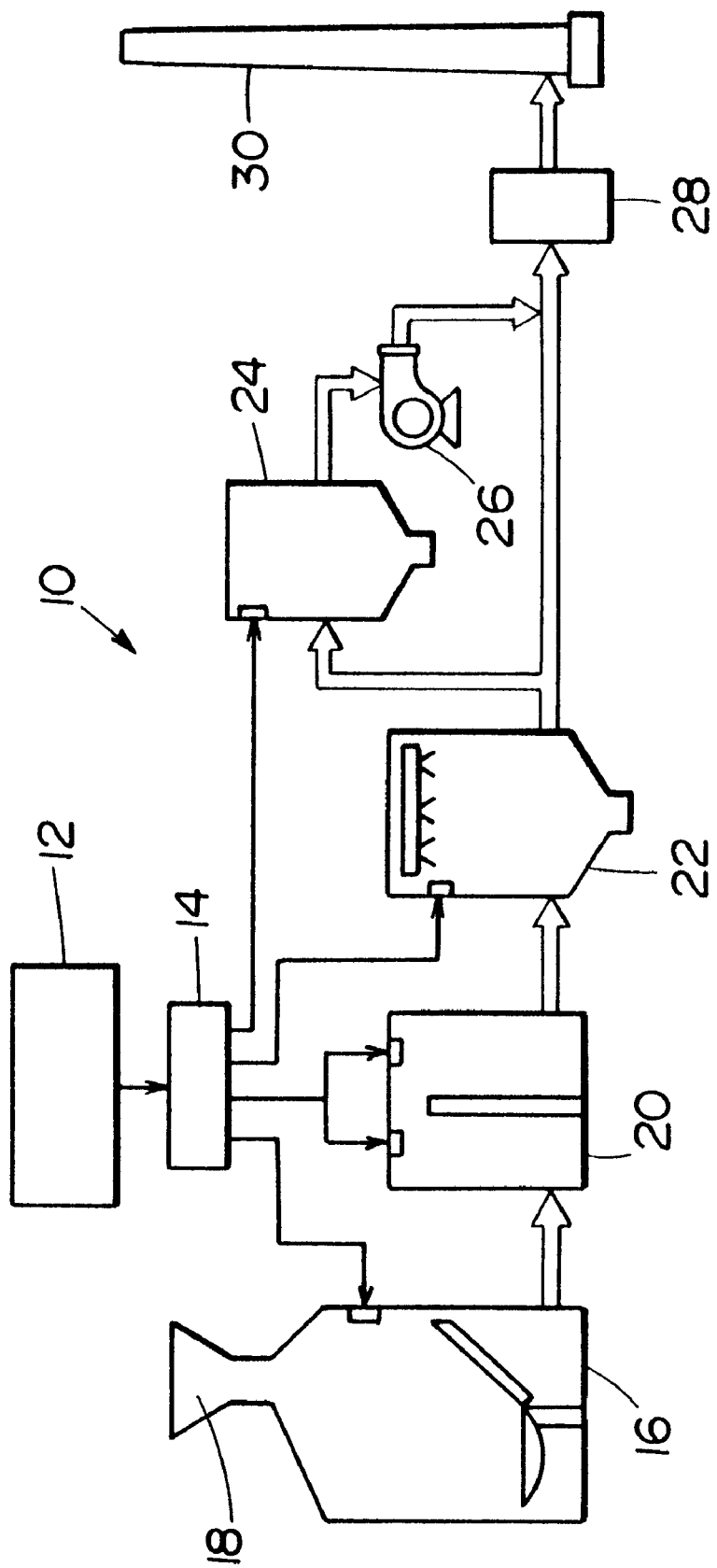
FIG. 1 is a schematic representation showing the configuration of a combustion system according to one embodiment of the present invention, in which the combustion system is incorporated into a typical fixed batch feed incinerator.

An embodiment of the present invention will be described hereunder by reference to the accompanying drawings. The present invention can be implemented by incorporating a singlet oxygen generator and an induction device therefor into any of various conventional combustion systems. FIG. 1 is a schematic representation showing the configuration of a combustion system according to one embodiment of the present invention, in which the combustion system is incorporated into a typical fixed batch feed incinerator. In a combustion system 10, substances to be burned are fed to a combustion furnace 16 by way of an inlet port 18 and are burned. Next, the thus-burned substances are fed to a re-combustion chamber 20, where the substances are further burned. A resultant exhaust gas is supplied to a gas cooling chamber 22, where the gas is cooled. After solid materials, such as dirt and dust, have been removed from the exhaust gas in a dust collection chamber 24, the gas is merged into the main stream of exhaust gas by means of an induced draft fan 26. The exhaust gas is exhausted from a chimney 30. Singlet oxygen, use of which is a feature of the present invention, is generated by a singlet oxygen generator 12 and is introduced into the combustion furnace 16 and the re-combustion chamber 20 by way of a regulator 14 which controls flow rate and pressure, thus contributing to combustion.

The singlet oxygen may also be introduced to the gas cooling chamber 22 and the dust collection chamber 24, as necessary. This measure is intended to sustain complete combustion as long as possible and to prevent generation of products which would otherwise result from incomplete combustion. More specifically, singlet oxygen is introduced in an appropriate amount into all the processes from combustion to exhaust, as needed.

An appropriate amount of singlet oxygen to be introduced is determined on the basis of monitoring a combustion state by means of sensors provided at inlet areas. The monitoring of the combustion state corresponds to a determination of temperatures, oxygen concentrations, and the concentration of carbon monoxide. Nozzles or valves are provided as specific induction means to be provided at inlet areas.

A singlet oxygen monitoring and removal device 28 is disposed in the vicinity at the end of the exhaust system, thereby preventing leakage of singlet oxygen to the outside of the combustion system 10 by way of the chimney 30.

Figure 2:
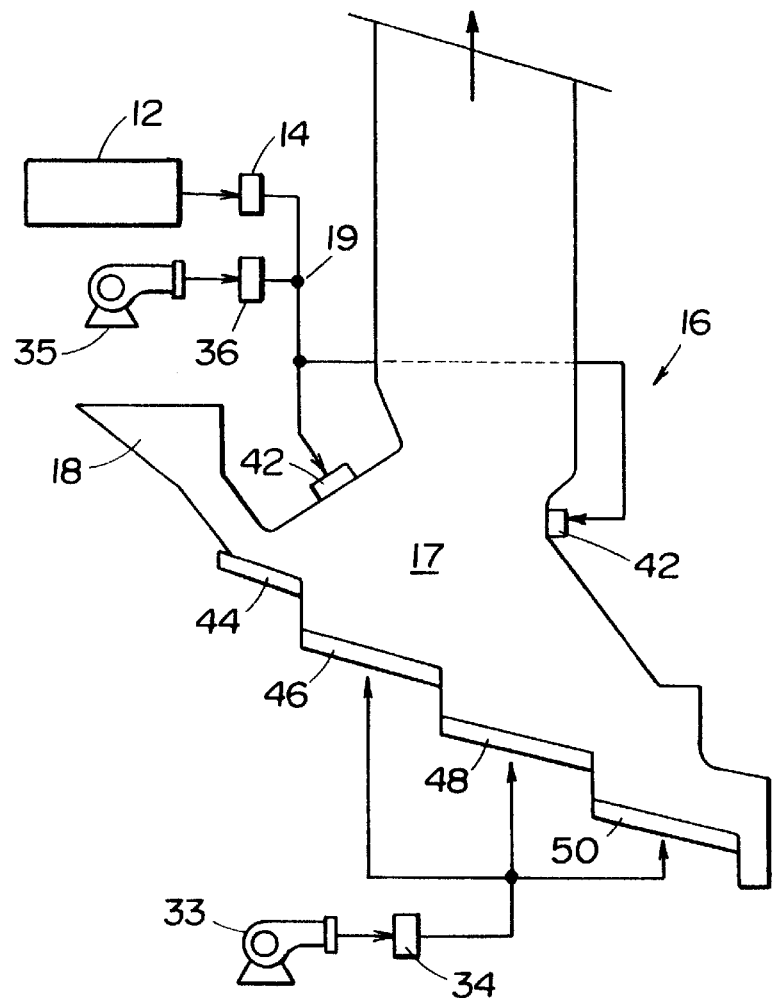
FIG. 2 is a schematic representation showing one example of the introduction of singlet oxygen into a combustion furnace in a case where a singlet oxygen generator is built into a continuous feed incinerator.

FIG. 2 is a schematic representation showing an example of introduction of singlet oxygen into a combustion furnace in a case where a singlet oxygen generator is incorporated into a continuous feed incinerator. The substances fed from the inlet port 18 are delivered to a combustion chamber 17 by means of a feeder 44. In the combustion chamber 17, the substances are burned while being conveyed in turn to a drying grate 46, a incinerating grate 48, and a banked fire grate 50. Primary air flows into the combustion chamber 17 from below grates 46, 48, and 50 by means of a primary air fan 33 and by way of a regulator 34. A gas cooling chamber continuing from the upper portion of the gas chamber 17 is omitted from the drawings.

The combustion chamber 17 is provided with induction nozzles 42 (two nozzles are shown in FIG. 2) by way of which secondary air is sent into the combustion chamber 17 by means of a secondary air fan 35. A regulator 36 controls the flow rate and pressure of the secondary air supplied from the secondary air fan 35. In this example, the singlet oxygen generated by the singlet oxygen generator merges with the secondary air by way of the regulator 14 (as indicated by reference numeral 19) and flows into the combustion chamber 17 from the induction nozzle 42 together with the secondary air. The regulator 14 controls the flow rate and pressure of the singlet oxygen generator. Although, in this example regulators 14 and 36 are illustrated as being independent units, they may be employed as a single regulator unit which comprehensively controls the flow rate and pressure of the secondary air and the singlet oxygen generator. Use of such a flow rate and pressure regulator enables an increase in the concentration of singlet oxygen, as well as supply of only singlet oxygen according to the state of combustion.

A temperature controller may be provided at any point along the way to the induction nozzle 42 from the singlet oxygen generator 12, thereby regulating the temperature of singlet oxygen to be introduced into the combustion chamber 17.

Figure 3:
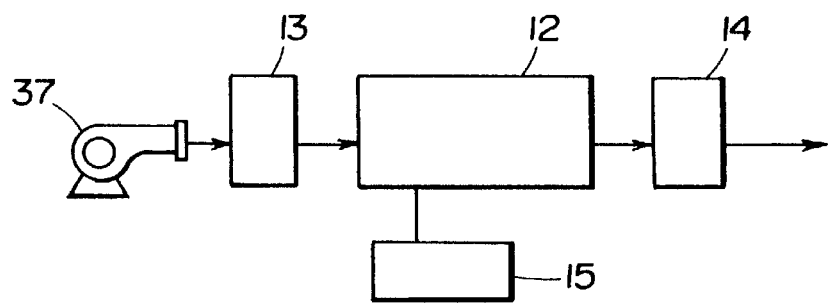
FIG. 3 is a schematic representation showing one example of arrangement of the singlet oxygen generator, a regulator, and units provided in the vicinity thereof according to the present invention.

FIG. 3 is a schematic representation showing an example of the singlet oxygen generator 12, the regulator 14, and the units provided in the vicinity thereof according to the present invention. Outside air is withdrawn by means of a fan 37, and the thus-withdrawn air is guided to the singlet oxygen generator 12 by way of an inlet regulator 13 for controlling the flow rate and pressure of air. Any one of oxygen or air contained in a high pressure vessel, air supplied from a compressor, or air at atmospheric pressure may be used as outside air.

The singlet oxygen generator 12 is required to continuously generate singlet oxygen in massive amounts. Specifically, utilization of microwave discharge is suitable for generation of singlet oxygen. For example, the singlet oxygen generator 12 is formed from a heat-resistant and pressure-resistant hollow resonator, and a triplet-oxygen-containing gas is fed into the hollow resonator together with a rare gas. An electric field of frequency on the order of hundreds of mega-hertz to tens of giga-hertz is applied to the hollow resonator from an a.c. power supply 15. As is experimentally acknowledged, singlet oxygen is sustained in an excited state for about 45 minutes in a vacuum. Accordingly, the interior of the hollow resonator is depressurized to a pressure lower than the atmospheric pressure, thereby enabling sustainment of the life of singlet oxygen. As a result, a sufficient time to introduce the singlet oxygen to the combustion chamber 17 can be ensured. As a matter of course, since not all the triplet oxygen molecules are converted into singlet oxygen molecules, the gas generated by the singlet oxygen generator 12 usually contains triplet oxygen or other air components other than singlet oxygen.

Microwave discharge is a physical means that employs electronic energy and is practical because it enables generation of singlet oxygen through use of only a vapor phase system. The thus-generated singlet oxygen is immediately introduced into the combustion chamber 17 by way of the outlet regulator 14 which controls the flow rate and pressure of the singlet oxygen generator. The temperature controller that controls the temperature of a generated gas and the regulator 14 may be integrated into a single unit.

In a case where a combustion system is configured as a structure such as that shown in FIGS. 1 and 2, desirably, the singlet oxygen generator 12 is located in sufficiently close proximity to the combustion furnace 16 or the combustion chamber 17. If feasible, the singlet oxygen generator 12 is built into or is disposed so as to adjoin the combustion furnace 16 or the combustion chamber 17. Alternatively, a high-speed air blower may be utilized in order to cause the thus-generated singlet oxygen to contribute to combustion as soon as possible, thereby increasing the utilization factor of singlet oxygen.

A practical reaction will now be described. In combustion reaction of triplet oxygen, which has a di-radical structure (•O—O•) and is in a ground state, various atoms and radicals are produced in a flame. Particularly, during combustion of hydro carbon, combustion reaction proceeds in a chained manner through various reactions such as abstraction reaction of hydrogen. In contrast, in combustion reaction of singlet oxygen that is in an excited state, active contribution of singlet oxygen to chain reaction of radicals is not observed. However, singlet oxygen is originally an electrophilic reagent and is prone to react with a substance having a greater electron donative characteristic. Accordingly, in contrast with triplet oxygen, which is liable to react with radicals, singlet oxygen is prone to induce two-electron reaction. For example, singlet oxygen is able to actively induce reactions which are difficult to induce by triplet oxygen, such as direct addition to a double bond and generation of dioxetane. Thus, the combustion system utilizing singlet oxygen according to the present invention enables incineration by use of only singlet oxygen as one mode of carrying out the invention. More preferably, attaining ideal combustion conditions by optimum combination of singlet oxygen and triplet oxygen and by means of complementary combustion reactions characterized respectively by singlet oxygen and triplet oxygen in coexistence can be said to be more desirable.

The combustion system according to the present invention may in principle be implemented by incorporating a singlet oxygen generator and an induction device into any of various conventional combustion systems. As mentioned above, combustion reaction using singlet oxygen completely differs from combustion reaction using triplet oxygen. Therefore, in designing a combustion system, consideration must be given to the difference in caloric power and combustion efficiency between combustion by singlet oxygen and combustion by triplet oxygen. In addition, in view of the extremely high reactivity characteristic of singlet oxygen, consideration must also be given to safety provisions against the durability of the combustion system and prevention of singlet oxygen leakage. Further, it goes without saying that conditions may vary according to the chemical properties of the substances to be burned.

Although singlet oxygen is well known for its participation in photosensitization reaction, little singlet oxygen is used industrially. Singlet oxygen has thus far never been utilized for combustion reaction. In photosensitization reaction, triplet oxygen in a ground state is transformed into singlet oxygen by acquisition of energy from excited coloring matters, thereby inducing various oxidation reactions. More specifically, singlet oxygen is produced by dissolving a coloring matter (or a photosensitive agent) such as rose bengal into a relevant solvent such as water or alcohol to thereby prepare a solution, and by exposure of the solution to a visible light ray while triplet oxygen is supplied to the solution. Alternatively, singlet oxygen may be produced by reaction of hydrogen peroxide with hypochlorite. As a matter of course, such a liquid-phase chemical means may also be utilized as a singlet oxygen generator.

In the combustion system according to the present invention, combustion which is superior in performance to combustion realized by a conventional combustion system may be effected by combustion of substances to be burned while ordinary triplet oxygen is replaced with or combined with singlet oxygen. For example, dioxin is said to form as a result of incomplete combustion, such as incineration at a low temperature of 800° C. or less. Utilization of singlet oxygen enables complete combustion even in the case of low-temperature incineration, thus preventing effluence of harmful substances. Further, because of the highly reactive characteristic of singlet oxygen, combustion reaction proceeds immediately, thereby resulting in an increase in combustion efficiency, a reduction in combustion time, and savings in fuel. Furthermore, superior combustion efficiency is also expected to contribute to an increase in generation of recyclable heat and a significant reduction in the amount of solid residues, which would otherwise result from combustion. It is also expected to result in an increase in workability of combustion processes, which in turn would contribute to reduction in personnel expenditures.

Although working of the present invention involves addition to a conventional combustion system of a singlet oxygen generator and an induction unit therefor, the expenditures incurred may be sufficiently offset by improvement in efficient combustion which can be implemented by the present invention as set forth. In terms of environmental protection, a combustion system which does not involve generation of harmful substances is of considerably greater social significance than is any other.

I claim:

1. A combustion system comprising:
   a singlet-oxygen generator for generating singlet-oxygen by excitation of oxygen from the triplet state to the singlet state; and induction means for introducing the thus-generated singlet oxygen into a combustion chamber.

2. A combustion system comprising:

a singlet-oxygen generator for generating singlet-oxygen by excitation of oxygen from the triplet state to the singlet state;

merging means for merging the thus-generated singlet oxygen and air; and introduction means for introducing the singlet oxygen merged with air into a combustion chamber.

3. A combustion system comprising a combustion chamber and a singlet oxygen generator built into the combustion chamber, in which generator singlet oxygen is generated by excitation of oxygen from a triplet state to a singlet state.

4. The combustion system as defined in any one of claims 1 through 3, wherein the singlet oxygen generator excites oxygen from a triplet state to a singlet state by use of microwave energy.

* * * * *